United States Patent
Trassy

(10) Patent No.: US 6,207,924 B1
(45) Date of Patent: Mar. 27, 2001

(54) INDUCTIVE PLASMA TORCH WITH A REAGENT INJECTOR

(75) Inventor: Christian Trassy, Grenoble (FR)

(73) Assignee: Centre National de la Recherche Scientifique, Paris (FR)

( * ) Notice: Subject to any disclaimer, the term of this patent is extended or adjusted under 35 U.S.C. 154(b) by 0 days.

(21) Appl. No.: 09/424,727

(22) PCT Filed: May 29, 1998

(86) PCT No.: PCT/FR98/01086

§ 371 Date: Feb. 16, 2000

§ 102(e) Date: Feb. 16, 2000

(87) PCT Pub. No.: WO98/54935

PCT Pub. Date: Dec. 3, 1998

(30) Foreign Application Priority Data

May 30, 1997 (FR) .................................. 97 06908

(51) Int. Cl.$^7$ .................................. B23K 10/00
(52) U.S. Cl. .................. 219/121.52; 219/121.51; 219/121.47; 315/111.51
(58) Field of Search ............. 219/121.52, 121.47, 219/121.59, 76.16, 121.51, 121.36; 315/111.51, 111.21

(56) References Cited

U.S. PATENT DOCUMENTS 4,665,296 * 5/1987 Iwata et al. .................. 219/121.52
5,012,065   4/1991 Rayson et al. .
5,285,046 * 2/1994 Hansz .................. 219/121.47
5,907,566   6/1999 Seltzer .
5,908,566 * 6/1999 Seltzer .................. 219/121.52

FOREIGN PATENT DOCUMENTS 60012668   8/1986 (JP) .
62274428   5/1989 (JP) .

OTHER PUBLICATIONS

P.W.J.M. Boumans and F.J. De Boer, Studies of flame and plasma torch emission for simultaneous multi–element analysis–I Preliminary investigations, Spectrochinica Acta., vol. 27B pp. 391–414.

* cited by examiner

Primary Examiner—Mark Paschall
(74) Attorney, Agent, or Firm—Buchanan Ingersoll, PC

(57) ABSTRACT

The invention concerns an inductive plasma torch comprising an external tube, an intermediate tube and a central injector (16) including at least a central tube (20, 21) injecting reagent and a peripheral sheathing tube (22). A gas similar to plasma gas is injected into the space between the central tube (20, 21) and the sheathing tube (22), in conditions suited for obtaining a laminar flow, said flow remaining laminar up to the plasma torch central zone. The sheathing tube emerges substantially at the first turn of the inductor coil.

6 Claims, 1 Drawing Sheet

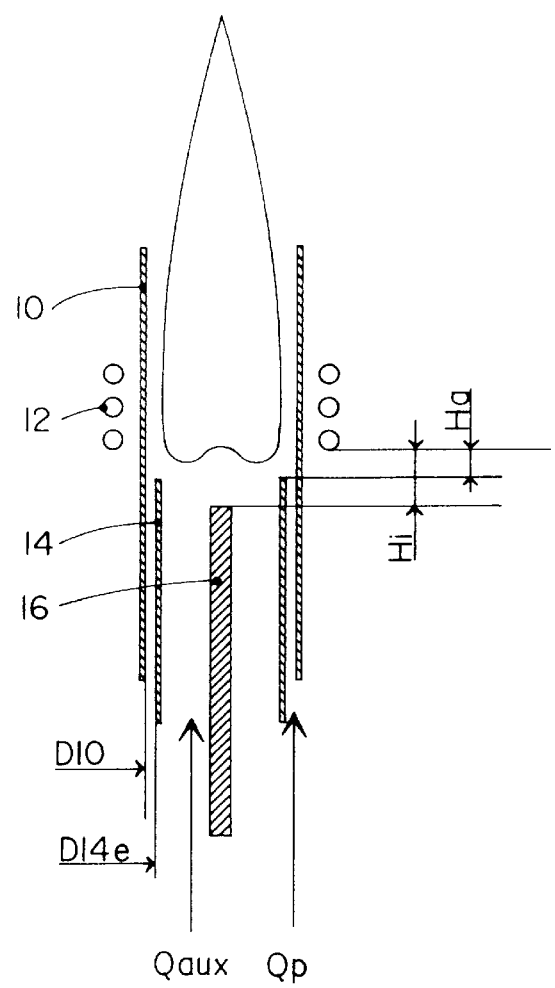
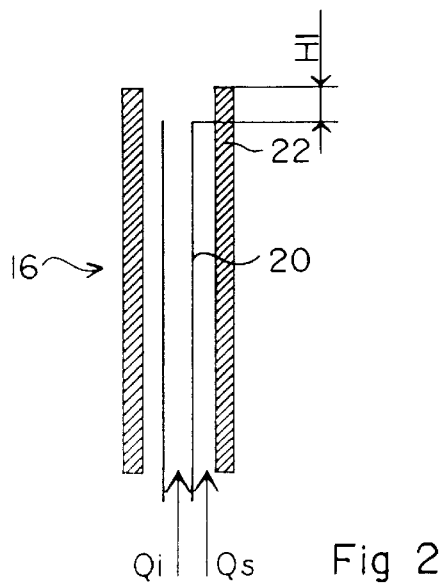 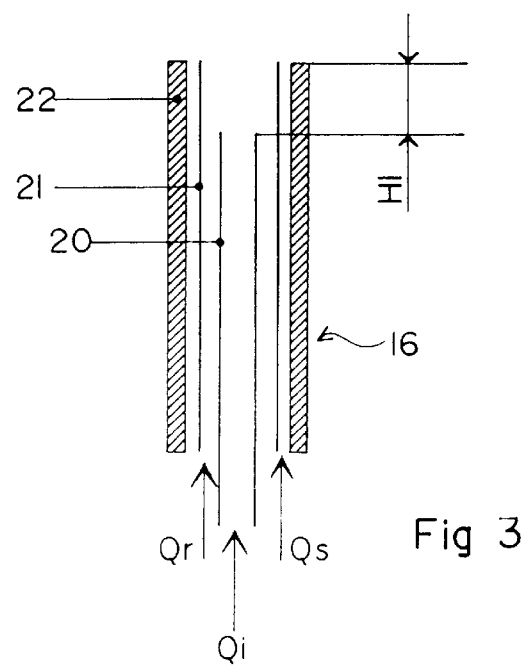

INDUCTIVE PLASMA TORCH WITH A REAGENT INJECTOR

The present invention relates to inductive plasma torches and more specifically the use of such plasma torches in the making of products and materials resulting from the injection of reactives into the plasma at high temperature.

Such a system is for example described in French patent 2,714,371 (Cabloptic SA). This patent more specifically aims at the forming of silica on a pellet. In this patent, the plasma torch includes an outer tube, an intermediary tube and a central injector. Between the outer tube and the intermediary tube is injected a plasma gas, for example oxygen. A neutral gas, for example argon, is provided between the intermediary tube and the injector. The injector includes a central tube in which are injected the reactive products, for example, $SiCl_4$ and $O_2$, and the central injector tube is surrounded by another tube. Between this other tube and the central tube is injected a sheathing gas, for example also argon. The exact function of the sheathing gas is not specified. It may be thought that it is intended for avoiding new depositions of the products formed from the reactive gases on the ends of the injector tube. The injector is clearly recessed with respect to the plasma formation area.

The present invention more specifically aims at the use of a plasma torch for the manufacturing of superfine powders, for example of tungsten or another refractory material, or alumina. To produce superfine powders from metallurgic powders, it is necessary that the injected products transit for a sufficient time through the core or central area of the plasma. This raises a difficulty since, due to electromagnetic forces (Laplace forces) acting on the plasma that is electrically conductive, the gas flow in the discharge is directed downstream (to the outlet) at the periphery of the plasma and is directed upstream in the axial area. Such recirculations tend to send towards the periphery the substances injected into the plasma. To force the reactives to pass into the axial area of the plasma, the speed of the injection gases is increased. But the substances that are on the edge of the injection flow are however driven by the recirculations towards the plasma periphery. This results in an inequality in the processing of the injected powders. Thus, with existing powder melting devices (spheroidizing, densification . . . ), irregularly processed powders are obtained, some being small and suitably spherical, others remaining sharp-angled, which makes them improper to certain uses. For example, in a method where metallurgic tungsten powders having a diameter on the order of 50 µm are introduced, a yield of 50 to 70% only of spheroidized (and thus melted) or superfine (and thus resulting from a total evaporation) tungsten powders appears to be obtained with existing methods while the rest substantially resembles the introduced powders.

Thus, the present invention aims at a plasma torch structure and at applications thereof improving the efficiency of conversion of a metallurgic powder into a small-grained powder or producing a small-grained powder from gaseous precursors.

To achieve these objects, the present invention provides an inductive plasma torch including an outer tube, an intermediary tube and a central injector including at least one central reactive injection tube and one peripheral sheathing tube. A gas of same nature as the plasma gas is injected into the space included between the central tube and the sheathing tube in conditions adapted to obtaining a laminar flow, this flow remaining laminar until the central plasma area of the torch is reached. The sheathing tube substantially emerges at the level of the first turn of the induction coil.

The present invention also aims at an application of the plasma torch hereabove to the forming of superfine powders of tungsten or any other refractory material, consisting of injecting into the central injection tube a metallurgic powder of tungsten or any other refractory material with a carrier gas such as a mixture of argon and nitrogen, the other gas injection rings receiving argon.

The end of the central tube is preferably slightly recessed with respect to the end of the sheathing tube.

The present invention also aims at an application of the plasma torch hereabove to the manufacturing of a superfine alumina powder, consisting of injecting an aluminum powder with a carrier gas such as a mixture of argon and hydrogen into the central injection tube, and oxygen into a peripheral tube, the other gas injection rings receiving argon.

The foregoing objects, features and advantages of the present invention will be discussed in detail in the following non-limiting description of specific embodiments in connection with the accompanying drawings.

FIG. 1 shows the general structure of an inductive plasma torch;

FIG. 2 schematically shows a single injector according to the present invention; and FIG. 3 schematically shows a double injector according to the present invention.

As shown in FIG. 1, a plasma torch device includes an outer tube 10 around which is wound an induction coil 12. An intermediary tube 14 is arranged within the outer tube and an injector 16 is arranged within the intermediary tube. D10 designates the inner diameter of external tube 10, D14e designates the external diameter of intermediary tube 14, and D14i designates the inner diameter of intermediary tube 14. Hi designates the possible recess of the end of the injector on the flame side with respect to the end of intermediary tube 14 and Ha designates the distance between the end of the intermediary tube and the first turn of induction coil 12. Qp designates the gas flow between outer tube 10 and intermediary tube 14. Qaux designates the gas flow between intermediary tube 14 and injector 16. In a simplified version, the torch may include no intermediary tube; in this case, there is no auxiliary flow Qaux.

In the case where the plasma torch is of low power (under 4 kW), it may be made of non-cooled silica and have an internal diameter D10 on the order of 25 mm. For high powers, for example on the order of 100 kW, a cooled tube that may have an internal diameter D10 greater than or equal to approximately 50 mm will be chosen for tube 10.

The present invention more specifically relates to the injector structure and its arrangement with respect to the induction coil.

FIG. 2 shows a first embodiment of the present invention in which injector 16 includes a single central injection tube 20. The injector itself, providing a flow Qi, is surrounded with a sheathing tube 22 and a gas flow Qs is provided between tubes 20 and 22.

In the embodiment of FIG. 3, the injector itself is a double flow injector including two internal concentric tubes 20 and 21 and a sheathing tube 22. Reactive components can thus be injected into each of the internal tubes according to flows Qi and Qr, as will be seen in the examples hereafter. In FIGS. 2 and 3, the central tube may have a recess Hl with respect to the downstream end of the injector.

According to a major aspect of the present invention, a sheathing gas or sacrificial gas flow Qs that is only used to channel the products injected into internal tubes 20, or 20 and 21, flows between the sheathing tube 22 and the immediately inner tube 20 (FIG. 2) or 21 (FIG. 3). The sizes, the flow rates and speeds are chosen so that the sacrificial gas flow is a laminar flow. However, especially in the case of FIG. 3, flow Qi preferably is a turbulent flow to properly mix with flow Qr, but without altering the laminarity of sheathing flow Qs.

According to an aspect of the present invention, distances Hi and Ha indicated in FIG. 1 are chosen to be substantially null, that is, the injector substantially emerges at the level of the first turn of induction coil 12. Then, sacrificial gas flow Qs can effectively canalize the reactive products to have them reach the plasma area in an axial region of the torch. If the disturbances of the coupling between the inductor and the plasma are desired to be limited, the sacrificial gas is chosen to be of same nature as the plasma gas.

Examples and applications of an injector according to the present invention will be indicated hereafter as an example.

EXAMPLE 1

Production of Very Small-Grained Spheroidized Tungsten Powders from Metallurgic Powders.

A torch having an internal diameter Di=48 mm, an intermediary tube 14 of a 40-mm internal diameter and a 36-mm internal diameter is used. A single injector of the type of that in FIG. 2 is used, the internal diameter of injector tube 20 being on the order of 5 mm and the ring through which the sacrificial gas flows having an internal radius on the order of 6 mm and an external radius on the order of 8 mm.

The following table gives an example of specific conditions of the previously defined flows Qp, Qaux, Qs, and Qi. V designates the speed of a given flow and Re designates the Reynolds number corresponding to this flow.

| Flow | nature | flow rate (1/min) | V (m/s) | Re |
| --- | --- | --- | --- | --- |
| Qp | argon | 75 | 2.3 | 1350 |
| Qa | argon | 14 | 0.3 | 400 |
| Qs | argon | 12 | 9.1 | 1360 |
| Qi | argon + nitrogen + powder | 9 + 3.5 | 10 | 3200 |

The transition between the laminar state and the turbulent state occurring, in a tube, for a value of the Reynolds number on the order of 2000, it can be seen that the states (except in the central tube) are laminar before the reunion of the different gases.

Parameters Hi, Ha, and Hl have respective values from 0 to 1 mm for Hi, of 0 mm for Ha and of 5 mm for Hl. The furnace power is 50 kw. The tungsten powder flow rate in the central tube is 600 g/h. A transformation rate on the order of 95% has been observed, to be compared to a transformation rate on the order of 50 to 70% for a conventional system. This transformation rate drops very fast when value Ha increases, and is no larger than 70% when Ha reaches 15 mm.

EXAMPLE 2

Production of Very Small-Grained and Pure Alumina Powder.

The reaction desired to be implemented is reaction $2Al + 3/2O_2 \rightarrow Al_2O_3$. For this purpose, the powder and the oxygen are desired to be intimately mixed, but only at the level of the injector outlet.

The powder has been injected by using as a carrier injection gas a mixture of argon and hydrogen. The reactive gas is oxygen. The function of hydrogen is to increase the thermal conductivity to increase the productivity. It can be used since it does not react with aluminum, which would be the case for nitrogen. To improve the mixture, the central injection tube is recessed with respect to the peripheral injection tube to create a turbulent area, the turbulence of which is however low so that all reactive gases are still efficiently sheathed by a laminar flow.

The following table gives an example of specific conditions of previously-defined flows Qp, Qaux, Qs, Qr and Qi.

| flow | nature | flow rate (1/mn) | V (m/s) | Re |
| --- | --- | --- | --- | --- |
| Qp | argon | 65 | 2.0 | 1170 |
| Qa | argon | 10 | 0.25 | 290 |
| Qs | argon | 10 | 7.6 | 1130 |
| Qr | oxygen | 26 | 26 | 3700 |
| Qi | argon + 10% $H_2$ + powder | 6 | 22 | 3180 |

Parameters Hi, Ha and Hl have respective values from 0 to 1 mn for Hi, of 0 mm for Ha and of 10 mm for Hl. The furnace power is 45 kW. The aluminum powder flow rate in the central tube is 900 g/h. A total transformation of the aluminum into a very small-grained powder is then observed. However, as soon as Ha reaches a value on the order of 10 to 15 mm, unprocessed aluminum grains appear to be mixed with alumina powder, which is then no longer perfectly pure.

The present invention is likely to have various alterations, modifications and improvements which can be brought by those skilled in the art. The sheathing gas is not necessarily identical to the plasma gas although this solution is preferred, as indicated above.

The size and positioning of the injector tubes, as well as the gas flows, will be chosen according to the envisaged application. There presently exist two main categories of applications: the physical processing of powders, with no chemical transformation (for example, spheroidizing or densification . . . ); and the production of powder involving a chemical reaction. In the case of a physical transformation, a single injector and laminar flows in the injection and sheathing will be chosen, to limit the powder dispersion as much as possible. The nature of the injection gas will be chosen according to the chemical compatibility with the powder and to the desired thermal conductivity. To limit the powder dispersion, Hl will preferably be equal to 0. In the case of a chemical transformation, a double injector will be chosen if some of the reactives must only be mixed together at the last moment (example: hydrogen and oxygen). The gas flow in the sheathing will be laminar. To improve the mixture of the reactive, height Hl may be up to 10 times greater than the diameter of tube 21, thus creating a pre-mixing chamber. The state of the gases in this chamber will be turbulent to improve the mixing of the reactives.

For tubes 20 and 21, thicknesses as small as possible will be chosen, given the mechanical and construction constraints to avoid the forming of recirculation areas at their ends.

To choose the diameters and flows according to the general above criteria, the conventional formulas enabling calculation of the speeds and Reynolds numbers for each of the gas flows will be used. For a more accurate sizing, commercial calculation programs, such as Fluent®, may be used for the inside of the injector or of the pre-mixing chamber; or such as the inductive plasma simulation programs sold by the Research Center on Plasma Technology (CRTP, Facultédes Sciences Appliquées, Sherbrooke, Quebec, J1K 2R1, Canada).

What is claimed is:

1. An inductive plasma torch including an outer tube (10), an intermediary tube (14) and a central injector (16) including at least one central reactive injection tube (20, 21) and one peripheral sheathing tube (22), wherein a gas of same nature as the plasma gas is injected into the space included between the central tube (20, 21) and the sheathing tube (22) in conditions adapted to obtaining a laminar flow, this flow remaining laminar until the central plasma area of the torch is reached, and the sheathing tube substantially emerges at the level of the first turn of the induction coil (12).

2. An application of the plasma torch of claim 1 to the forming of superfine powders of tungsten or any other refractory material, consisting of injecting into the central injection tube a metallurgic powder of tungsten or any other refractory material with a carrier gas such as a mixture of argon and nitrogen, the other gas injection rings receiving argon.

3. The application of claim 2, wherein the end of the central tube is preferably slightly recessed with respect to the end of the sheathing tube.

4. The application of claim 2, wherein the flow in the central tube is on the order of 13 l/mn, the flow in a sacrificial ring is on the order of 12 l/mn, the flow in an auxiliary ring is on the order of 14 l/mn and the flow in the external ring is on the order of 75 l/mn.

5. An application of the plasma torch of claim 1 to the manufacturing of a superfine alumina powder, consisting of injecting an aluminum powder with a carrier gas such as a mixture of argon and hydrogen into the central injection tube (20), and oxygen into a peripheral tube (21), the other gas injection rings receiving argon.

6. The application of claim 5, wherein the end of the central tube is slightly recessed with respect to the end of the peripheral tube.

* * * * *